June 17, 1969     D. W. ZIMMERMAN     3,450,428

DEVICE FOR HANDLING WORKPIECES

Filed July 31, 1967

INVENTOR.
DELBERT W. ZIMMERMAN
BY
*Oden & Oden*
ATTORNEYS

United States Patent Office 3,450,428
Patented June 17, 1969

3,450,428
DEVICE FOR HANDLING WORKPIECES
Delbert W. Zimmermann, 7235 Meadow Lake,
Birmingham, Mich. 48010
Filed July 31, 1967, Ser. No. 657,341
Int. Cl. B66c 1/34
U.S. Cl. 294—82
12 Claims

ABSTRACT OF THE DISCLOSURE

A hoist hook is provided with a workpiece-engaging strip which enables the workpiece to be handled without damage. The workpiece-engaging strip is designed to be easily replaceable so that a hoist operator can replace the strip, when necessary, without tools and in a minimum amount of time.

---

This invention relates to a workpiece-engaging device and particularly to a hoist hook with a workpiece-engaging strip enabling a workpiece to be handled without damage.

Workpiece-engaging devices have been employed heretofore with various types of covers or pads to cushion the engagement of the device with the workpiece. In one such device, a tubular sleeve was merely placed over the hook. The sleeve tended to encumber the hook, however, and also was more expensive than otherwise necessary because the sleeve covered the entire hook, whereas only a small portion of it was necessary to engage the workpiece. In another device employing a pad, the pad was located between the workpiece and a portion of the hook. However, in this instance, the pad was affixed to the hook by permanent fasteners so that replacement of the pad in the field without undue interruption in the work operation was not possible.

The present invention provides a workpiece-engaging device with a quickly replaceable insert designed to engage and support a machined portion of the workpiece without damage to that portion. Specifically, the device is illustrated and described in the form of a hoist hook with a unique workpiece-engaging strip employed on the hook having many advantages over those heretofore suggested. The hook itself has a groove or slot extending around the inner periphery of the curved portion of the hook and preferably partly along an intermediate portion adjacent the curved portion. The workpiece-engaging strip is co-extensive with the groove and has a broad flat surface engageable with the workpiece and particularly with a machined bearing portion of a crankshaft. The strip further has a ridge extending from the side opposite the workpiece-engaging surface and cooperable with the groove to frictionally and securely hold the strip with respect to the hook. With this arrangement, the strip is securely held by the hook and yet can be quickly and easily replaced by the operator without the need for any tools whatsoever. The strip preferably is made of plastic or rubber so as to be resilient and deformable to assure engagement with the machined surface of the workpiece without injury thereto. This is particularly important for crankshafts where the bearing portions are carefully machined and ground and in which the slightest scratch can be serious to the functioning of the machined surface. The material also is durable and resistant to chip impregnation.

It is, therefore, a principal object of the invention to provide an improved workpiece-engaging device with an improved workpiece-engaging pad associated therewith to enable handling of a workpiece without damage.

Another object of the invention is to provide a hoist hook with a workpiece-engaging strip capable of encompassing part of the workpiece without damage thereto, and with the strip being quickly and easily replaceable in the field by an unskilled worker without tools.

Other objects and advantages of the invention will be apparent from the following detailed description of a preferred embodiment thereof, reference being made to the accompanying drawings, in which.

Figure 1:
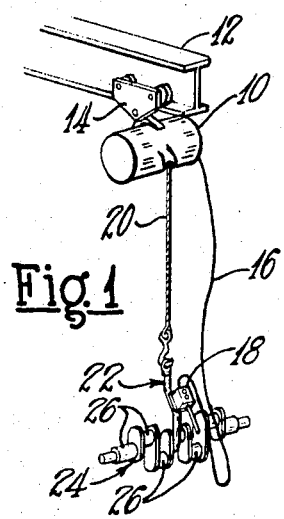
FIG. 1 is an overall view in perspective of a hoist having a hoist hook embodying the invention.

Referring to FIG. 1, a hoist 10 is suspended from a track 12 by a trolley 14. The hoist 10 can be of the type shown in Powell Patent No. 3,260,508 and can be controlled through a vent line 16 by a control handle and valve assembly 18. The hoist also has a hoist cable 20 extending downwardly to a hoist hook 22 embodying the invention. The hoist hook 22 is shown engaged with a workpiece which is to be handled by an operator, with the workpiece being specifically shown in the form of a crankshaft 24. The crankshaft 24 has bearing surfaces 26 which are precisely machined and ground. These surfaces must be fully protected against damage since a small scratch or nick thereon can be serious.

Figure 2:
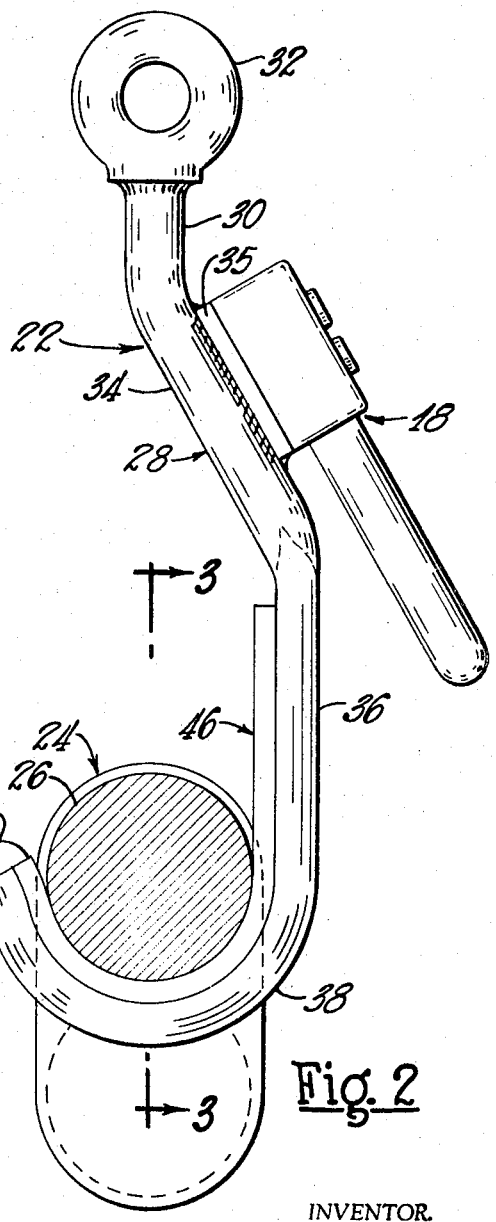
FIG. 2 is a greatly enlarged side view in elevation of the hoist hook of FIG. 1.

Referring particularly to FIG. 2, the hoist hook 22 is of an offset design so that the center of gravity of the workpiece will be directly under the hoist cable 20. The hoist hook 22 includes an elongate member 28 which can be made of a single length of one-half inch black pipe, by way of example, to provide sufficient strength and yet low cost for the hook. The elongate member 28 has an upper end portion 30 to which a hoist cable connection or ring 32 is affixed, as by welding, and an offset portion 34 which positions the workpiece in line with the hoist cable. A mounting plate 35 on the offset portion carries the handle and valve assembly 18 to facilitate operation by the hoist operator. Below the offset portion 34, the elongate member 28 further has a straight, intermediate portion 36 and a workpiece-engaging portion 38 contoured to fit with a workpiece. Specifically, the portion 38 is curved with a radius slightly larger than the radius of the machined portion 26 and is designed to hold the machined portion 26 concentrically therewith.

Figure 3:
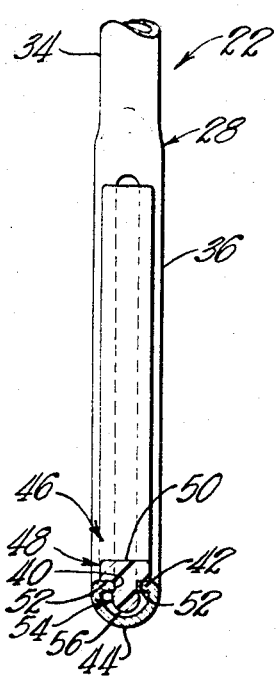
FIG. 3 is an enlarged, sectional view taken along the line 3—3 of FIG. 2.

As shown particularly in FIG. 3, the straight portion 36 and the curved portion 38 of the hook 22 are of D-shaped configuration in transverse section with the back of the D facing toward the workpiece. A groove or slot 40 is formed in a back portion 42 of the D-shaped portion with the flat portions on either side of the groove being connected by a rounded outwardly-extending portion 44 forming the front of the D.

In accordance with the invention, a workpiece-engaging strip or pad 46 is positioned along the straight and curved portions 36 and 38 toward the workpiece 24 so that the workpiece and hook never come directly into contact with one another. The strip 46 is co-extensive with the groove 40 and extends for a substantial distance up the straight portion 36 as well as around the curved portion 38. In this manner, the upper portion of the strip can be brought against the workpiece with the curved portion 38 spaced therebelow to readily position the hook properly with respect to the workpiece. The hook can then be raised to engage the machined portion 26 of the workpiece with the curved portion 38 so that engagement of the hook and workpiece can be accomplished rapidly and with relatively little skill.

The strip 46, as shown in FIG. 3, is generally T-shaped in cross section. The strip includes an upper bar portion 48 having a flat upper surface 50 and a pair of shoulders 52 which seat on the back portion 42 of the D-shaped elongated member. The flat surface 50 enables the hook to engage the machined bearing portion 26 over a relatively wide area with the weight of the crankshaft thereby distributed over a large portion of the strip 46. Further, the shoulders 52 provide effective support for the strip on the back portion 42.

The strip 46 further has a ridge or leg 54 extending therefrom on the side opposite the surface 50 with the ridge 54 extending the length of the strip 46. The ridge 54 preferably has a rounded end 56 which facilitates the insertion of the ridge in the groove 40. The thickness of the ridge 54 preferably slightly exceeds the width of the groove 40 so that the strip 46 will be held securely within the groove. With the ridge thickness exceeding the groove width, the portion of the ridge within the hollow elongate member assumes a slightly bulbous configuration, as shown in FIG. 3, which further aids in holding the strip tightly.

Of particular importance, the strip 46 can be quickly removed and replaced by a new strip in the field by an operator or other worker. This is accomplished simply by pulling outwardly on one end of the strip and removing it from the hook. The new strip can be installed in the same manner, by starting at one end and pushing the strip into the groove and proceeding toward the other end to complete the assembly. No tools are required and the replacement takes but a matter of seconds.

As shown in FIG. 2, a rounded nose 58 can be affixed to the end of the curved portion 38 to complete the hook. The transverse extremity of the nose 58 does not extend beyond the flat surface 50 of the strip 46 so that the nose portion will not engage the machined portion 26 of the workpiece 24. The nose portion 58 can be of a soft metal, such as lead, if desired.

I claim:
1. A device for handling workpieces having surfaces which are susceptible to damage, said device comprising an elongate member having an upper end adapted to be fastened to a hoist cable and a contoured lower portion having a predetermined shape, an edge of said contoured portion having a groove extending substantially the length thereof, a resilient, deformable strip having a length substantially co-extensive with said groove, said strip comprising a flat portion of predetermined thickness having a smooth workpiece-engaging surface which is straight in transverse cross section across the strip, said strip further having a ridge extending outwardly at the surface opposite the smooth surface and extending substantially the length of said strip, and said ridge being received in friction-tight relationship with said groove.

2. A device according to claim 1 characterized further by said contoured lower portion of said elongate member being hollow with said groove communicating with the interior thereof.

3. A device according to claim 2 wherein said ridge of said strip extends through said groove and into the interior portion with said ridge being expanded slightly in said interior portion.

4. A device according to claim 3 wherein said contoured lower portion is of generally D-shaped configuration in transverse cross section.

5. A device according to claim 1 characterized further by a mounting plate affixed to an intermediate portion of said elongate member to carry a control for the hoist.

6. A hoist hook for handling crankshafts or other workpieces having precisely machined surfaces which are subject to possible damage, said hoist hook constituting an elongate metal member having a connection at the upper end adapted to be fastened to a hoist cable, a straight intermediate portion, and a curved lower portion immediately below said straight portion of predetermined radius, an inner peripheral edge of said curved portion having an elongate opening extending substantially the length thereof and upwardly onto said straight portion, a resilient, deformable strip having a length substantially co-extensive with said opening, said strip comprising a bar portion having a smooth inner surface for engaging a machined portion of the workpiece, said strip having a ridge extending outwardly on the side opposite the workpiece-engaging surface, and extending substantially the length thereof, said ridge being received in said opening in said hook for holding said strip in secure relationship with respect to said hook.

7. A hoist hook according to claim 6 characterized further by the curved portion of said hoist hook being hollow and said elongate opening communicates with the hollow interior of the hook.

8. A hoist hook according to claim 7 wherein said ridge of said strip extends through said opening and into said hollow interior and said ridge is expanded slightly in said hollow interior.

9. A hoist hook according to claim 6 wherein the smooth inner surface of said bar portion is flat and said bar portion has shoulders on the side opposite the flat surface for engaging said curved lower portion on each side of said elongate opening.

10. A hoist hook according to claim 6 wherein said curved portion is of D-shaped configuration in transverse cross section, the smooth inner surface of said bar portion is flat and said bar portion has shoulders which rest on the back of the D-shaped portion.

11. A device for handling a workpiece having a machined portion which is susceptible to damage, said device comprising a supporting member having a surface contoured generally to the shape of the machined portion, said contoured surface having an elongate recess therein extending longitudinally of said surface, and a resilient, deformable pad comprising a flat portion of predetermined thickness having a smooth workpiece-engaging surface for engaging the machined portion over a relatively broad area, said pad further having an elongate projection extending outwardly opposite the workpiece-engaging surface, said projection being received in friction-tight relationship in said recess, and constituting the sole connection between said supporting member and said deformaable pad to enable said pad to be quickly removed and replaced.

12. A device according to claim 11 wherein said pad is an elongate strip of plastic material, and said projection is a ridge substantially co-extensive with said recess.

References Cited

UNITED STATES PATENTS 1,836,576  12/1931  Chalmers _____ 294—82

ANDRES H. NIELSEN, *Primary Examiner.*